April 20, 1965   KARL-HEINZ WÖHNER   3,179,028
DEVICE FOR FOCUSSING OF PHOTOGRAPHIC OBJECTIVES
Filed Feb. 11, 1963
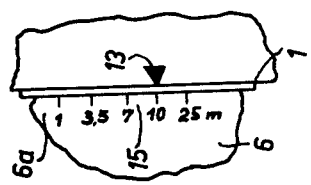
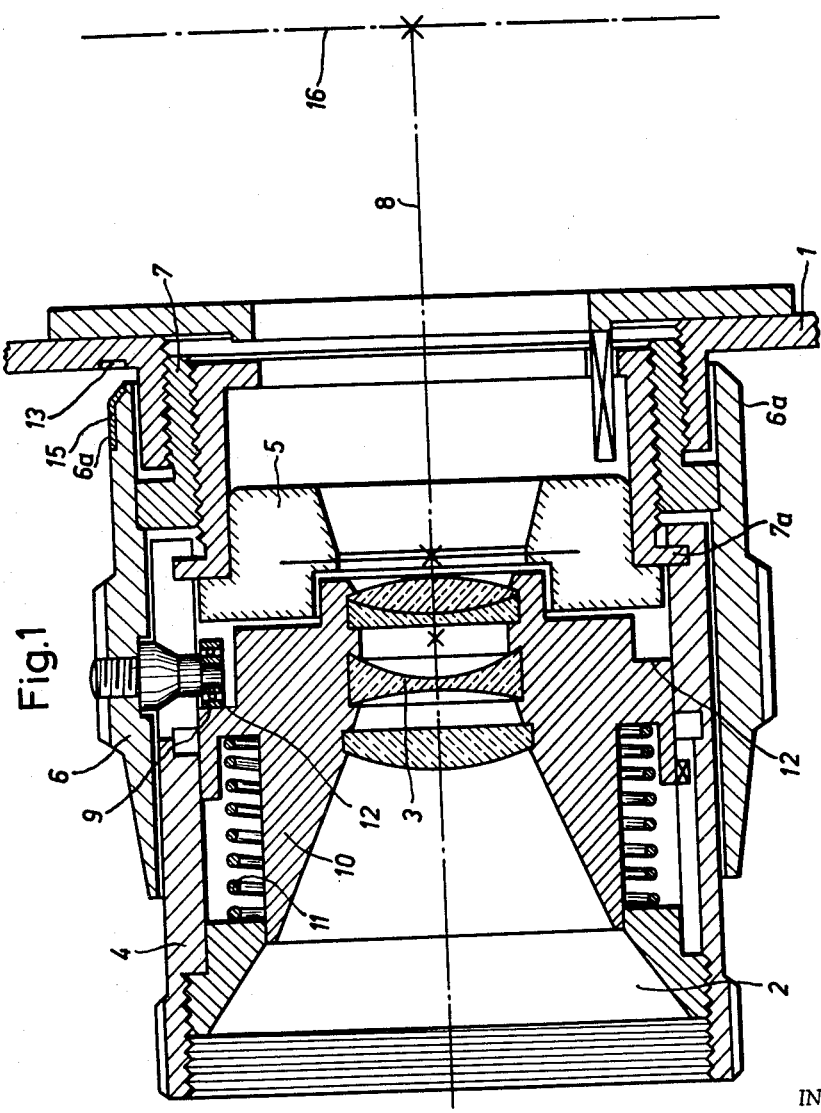
INVENTOR:
Karl-Heinz Wöhner,
BY Singer, Stern & Carlburg
ATTORNEYS United States Patent Office 3,179,028
Patented Apr. 20, 1965

3,179,028
DEVICE FOR FOCUSSING OF PHOTOGRAPHIC OBJECTIVES
Karl-Heinz Wöhner, Oberkochen, Wurttemberg, Germany, assignor to Carl-Zeiss Stiftung, doing business as Carl Zeiss, Wurttemberg, Germany, a corporation of Germany
Filed Feb. 11, 1963, Ser. No. 257,720
Claims priority, application Germany, Feb. 12, 1962, Z 9,226
9 Claims. (Cl. 95—44)

The invention relates to a photographic camera provided with an interchangeable lens system and in which the central shutter is built into the camera while the lens system is exchangeably mounted in front of the shutter. The focussing takes place by slidably adjusting the photographic objective relatively to the picture plane and the shutter in the direction of the optical axis.

It is an object of the invention to provide a device for focussing photographic objectives of cameras of the aforementioned type by changing the axial distance between the shutter and the camera casing or the plane of the film, respectively, and also the axial distance between the objective and the shutter.

The present invention makes it possible to obtain shorter rotative adjusting movements also for objectives having longer focal lengths, because the limited axial adjustability of the shutter is increased by the additional axial adjustability of the objective relative to the shutter and therewith relative to the film plane. In spite of the extended axial adjustment achieved by the device according to the present invention, the vignetting produced by the blades of the shutter corresponds only to the smaller axial adjustment between the objective and the shutter.

It is another object of the invention to provide means for changing the distance between the objective and the shutter. The axial adjustment of the objective relative to the shutter may according to the invention be accomplished by a distance adjusting ring arranged on the camera and connected by an adjusting thread with the shutter, whereby upon rotative adjustment of this adjusting ring the shutter is moved along the optical axis while a main mount portion of the preferably interchangeable photographic objective, which is mounted on the camera and which moves with the shutter, is provided with means for changing the axial distance between the photographic objective and the shutter.

In accordance with the invention the change in the axial adjustment of the shutter relative to the camera casing is preferably made separate from the axial adjustment of the photographic objective relative to the shutter, but is made by the same element which changes the focal length of the particular interchangeable photographic objective which is used and is carried out, for instance, by means of a cam face or the like which is arranged on the objective. This cam face controls the change of the distance between the objective and the shutter depending upon the focal length of the objective used.

In this manner the invention makes it possible that in a camera provided with an interchangeable lens system a rotative adjustment of the distance adjusting ring about a predetermined angle, which distance adjusting ring is arranged on the camera casing and is common to all objectives, all of the photographic objectives having different focal lengths are adjusted to the same range. An objective has been adjusted to a certain predetermined distance E when the total axial adjustment of the objective relative to the picture plane satisfies the equation $$X = \tfrac{1}{2}[(E-FF') - \sqrt{(E-FF')^2 - 4f^2}]$$

wherein E is the distance of the object to be photographed from the film plane, $f$ is the focal length of the photographic objective and FF' is the distance between the focal points of the photographic objective.

In accordance with the invention the total axial adjustment X is obtained by adding the two axial adjustment values $X_1$ and $X_2$. If now the axial adjustment next to the side of the camera casing is produced, namely an adjustment of the shutter $X_1$ relative to the camera casing, by means of the threaded adjustment ring, then the axial adjustment $X_2$ next to the objective, namely, the axial adjustment between the objective and the shutter, must be the sum of $X_1 \pm X_2 = X$ wherein X again is the total axial adjustment. This condition may be fulfilled by a suitable shaping of the cam discs or the like which control the axial adjustment of the objectives and are operated by a rotation of the distance adjusting ring. If all objectives of the interchangeable lens system are provided with such a cam disc, which is constructed in accordance with the focal lengths of the objectives and the aforementioned equation, then they may rely upon a single common distance scale provided on the distance adjusting ring.

The fact that the distance adjusting ring is rotated by the same angular distance for adjusting objectives with different focal lengths has the further advantage that a flash bulb mechanism which is common to all objectives and performs, after setting the guide number of the flash bulb, an automatic adjustment of the diaphragm in dependence of the distance adjustment, may be built into the camera casing.

The invention will now be further described with reference to the accompanying drawing whose figures illustrate schematically a device for carrying out the method of the present invention.

The FIG. 1 shows an axial sectional view of the front portion of a photographic camera provided with a vertically positioned camera wall 1 to which is attached the interchangeable photographic objective 2 comprising a lens system 3 and a cylindrical main mount 4 therefor. A shutter 5 is arranged in rear of the lens system 3 and in front of the plane of the film or image plane 16 in the camera casing. A distance adjusting ring 6 surrounds the cylindrical mount 4 and is connected with the shutter 5 by means of an adjusting thread arrangement 7 in such a manner that the shutter 5 moves straight along the optical axis 8 when the distance adjusting ring 6 is rotated. During this axial displacement of the shutter 5 the mount 4 is also axially displaced by a projection 7a and since the lens system 3 is arranged in the main mount 4, the lens system is also axially displaced.

In the illustrated embodiment of the invention the means for changing the distance between the photographic objective 3 and the shutter 5, which change of distance is an object of the focussing method of the invention, is arranged on the interchangeable photographic objective 2 and on the distance adjusting ring 6. The distance adjusting ring 6 is provided with an inwardly projecting stop 9 which is engaged by the mount 10 of the lens system 3. The mount 10 is surrounded by a helical spring 11 which urges a helical shoulder 12 on the mount 10 against the stop 9. The helical shoulder 12 of the mount 10 constitutes an annular cam face so that upon rotation of the distance adjusting ring 6 not only an axial displacement of the shutter 5 takes place, but at the same time also the objective 3 is displaced axially relative to the shutter 5. The annular cam face 12 has such a helical shape that it controls the distance of the objective 3 relative to the shutter 5 in dependence of the focal length of the photographic objective. In a camera provided with interchangeable photographic objectives having each a different focal length it is obvious that each objective is provided with an annular cam face which is so dimensioned that upon rotation of the distance adjusting ring 6 about a predetermined angle and axial displacement of the shutter 5 thus brought about, the distance of the different objectives relative to the shutter 5 is changed in such a manner that these objectives are adjusted to the same distance range. The distance adjusting ring 6 may then be provided with a single distance scale 15 which is usable for all these interchangeable objectives. Therefore, such a distance scale 15 may be arranged on a circumferential portion 6a of the ring 6 which lies adjacent the camera wall 1 which latter carries an index mark 13 for indicating the distance on the distance scale 15 for which the attached photographic objective has been adjusted.

FIG. 2 illustrated in a partial top elevation view the arrangement of the distance scale on the distance adjusting ring.

What I claim is:

1. In a photographic camera provided with a photographic objective and a shutter in rear of said objective, a rotatably mounted distance adjusting ring, a first means operatively connecting said distance adjusting ring with said photographic objective for axial displacement when said distance adjusting ring is rotated, and a second means operatively connecting said distance adjusting ring with said shutter for axially displacing the same when said distance adjusting ring is rotated.

2. In a photographic camera provided with an axially adjustable photographic objective and a shutter in rear of said objective, a distance adjusting ring rotatably mounted on said camera, a first means operatively connecting said distance adjusting ring with said photographic objective for axial displacement when said distance adjusting ring is rotated, and a second means operatively connecting said distance adjusting ring with said shutter for axially displacing the same when said distance adjusting ring is rotated.

3. In a photographic camera provided with an axially adjustable photographic objective and a shutter in rear of said objective, a distance adjusting ring rotatably mounted on said camera, a first means operatively connecting said distance adjusting ring with said photographic objective for axial displacement when said distance adjusting ring is rotated, and a second means operatively connecting said distance adjusting ring with said shutter for axially displacing the same when said distance adjusting ring is rotated, said first means comprising an inwardly extending projection on said distance adjusting ring and a cam-shaped shoulder on said photographic objective which is engaged by said projection.

4. In a photographic camera provided with an axially adjustable photographic objective and a shutter in rear of said objective, a distance adjusting ring rotatably mounted on said camera, a first means operatively connecting said distance adjusting ring with said photographic objective for axial displacement when said distance adjusting ring is rotated, and a second means operatively connecting said distance adjusting ring with said shutter for axially displacing the same when said distance adjusting ring is rotated, said second means comprising a threaded connection between said distance adjusting ring and said shutter and means for axially displacing said shutter by said threaded connection relative to said photographic objective when said distance adjusting ring is rotated.

5. In a photographic camera provided with an axially adjustable photographic objective and a shutter in rear of said objective, a distance adjusting ring rotatably mounted on said camera, a first means operatively connecting said distance adjusting ring with said photographic objective for axial displacement when said distance adjusting ring is rotated, and a second means operatively connecting said distance adjusting ring with said shutter for axially displacing the same when said distance adjusting ring is rotated, said first means comprising an inwardly extending projection on said distance adjusting ring and a cam-shaped shoulder on said photographic objective which is engaged by said projection, said second means comprising a threaded connection between said distance adjusting ring and said shutter and means for axially displacing said shutter by said threaded connection relative to said photographic objective when said distance adjusting ring is rotated.

6. In a photographic camera provided with an axially adjustable photographic objective and a shutter in rear of said objective, a distance adjusting ring rotatably mounted on said camera, a first means operatively connecting said distance adjusting ring with said photographic objective for axial displacement when said distance adjusting ring is rotated, and a second means operatively connecting said distance adjusting ring with said shutter for axially displacing the same when said distance adjusting ring is rotated, said first means comprising an inwardly extending projection on said distance adjusting ring and a cam-shaped shoulder on said photographic objective which is engaged by said projection, said cam-shaped shoulder being effective to change the distance of the photographic objective from the shutter in dependence of the focal length of said photographic objective.

7. In a photographic camera provided with an interchangeable photographic objective and adapted to accommodate individual photographic objectives of different focal lengths, a shutter in rear of the interchangeable photographic objective which is attached to said camera, a distance adjusting ring rotatably mounted on said camera and having a single distance scale thereon which is used with each one of said photographic objectives adapted to be attached to said camera, an inwardly extending projection on said distance adjusting ring, and a cam-shaped shoulder on said photographic objective engaged by said projection whereby said photographic objective is axially displaced relative to said shutter when said adjusting ring is rotatably adjusted and the distance scale is moved relative to a fixed index mark on said camera, and means operatively connecting said distance adjusting ring with said shutter for axially displacing the latter relative to said photographic objective when said distance adjusting ring is rotated.

8. In a photographic camera provided with an interchangeable photographic objective and adapted to accommodate individual photographic objectives of different focal lengths, a shutter in rear of the interchangeable photographic objective which is attached to said camera, a distance adjusting ring rotatably mounted on said camera and having a single distance scale thereon which is used with each one of said photographic objectives adapted to be attached to said camera, an inwardly extending projection on said distance adjusting ring, and a cam-shaped shoulder on said photographic objective engaged by said projection whereby said photographic objective is axially displaced relative to said shutter when said adjusting ring is rotatably adjusted and the distance scale is moved relative to a fixed index mark on said camera, the cam-shaped shoulders on said interchangeable photographic objectives having different focal lengths being so constructed that the axial displacement caused by said distance adjusting ring is such that the same angular adjustment of said ring will cause all objectives to be adjusted to the same distance of an object to be photographed, and means operatively connecting said distance adjusting ring with said shutter for axially displacing the latter relative to said photographic objective when said distance adjusting ring is rotated.

9. In a photographic camera provided with an interchangeable photographic objective and adapted to accommodate individual photographic objectives of different focal lengths, a shutter in rear of the interchangeable photographic objective which is attached to said camera, a distance adjusting ring rotatably mounted on said camera and having a single distance scale thereon which is used with each one of said photographic objectives adapted to be attached to said camera, an inwardly extending projection on said distance adjusting ring, and a cam-shaped shoulder on said photographic objective engaged by said projection whereby said photographic objective is axially displaced relative to said shutter when said adjusting ring is rotatably adjusted and the distance scale is moved relative to a fixed index mark on said camera, and a threaded connection between said distance adjusting ring and said shutter for axially displacing said shutter relative to said photographic objective when said distance adjusting ring is rotated.

References Cited by the Examiner
UNITED STATES PATENTS 2,265,896  12/41  Dalotel ---------------- 95—45

NORTON ANSHER, Primary Examiner.

JOHN M. HORAN, Examiner.